(12) United States Patent
Iwamoto

(10) Patent No.: US 10,802,249 B2
(45) Date of Patent: Oct. 13, 2020

(54) ZOOM LENS AND IMAGE PICKUP APPARATUS INCLUDING SAME

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 15/985,320

(22) Filed: May 21, 2018

(65) Prior Publication Data

US 2018/0348481 A1 Dec. 6, 2018

(30) Foreign Application Priority Data

May 31, 2017 (JP) ................. 2017-108261

(51) Int. Cl.
| | |
|---|---|
| *G02B 9/64* | (2006.01) |
| *G02B 13/02* | (2006.01) |
| *G02B 7/10* | (2006.01) |
| *G02B 13/06* | (2006.01) |
| *H04N 5/232* | (2006.01) |
| *H04N 5/225* | (2006.01) |

(52) U.S. Cl.
CPC ............... *G02B 9/64* (2013.01); *G02B 7/102* (2013.01); *G02B 13/02* (2013.01); *G02B 13/06* (2013.01); *H04N 5/2254* (2013.01); *H04N 5/23238* (2013.01); *H04N 5/23296* (2013.01)

(58) Field of Classification Search
CPC . G02B 9/64; G02B 7/10; G02B 7/102; G02B 13/02; G02B 13/06; G02B 13/18; G02B 15/14; G02B 15/173; G02B 15/22; G02B 15/177; G02B 27/646; H04N 5/232; H04N 5/23296; H04N 5/23238; H04N 5/225; H04N 5/2254; H04N 5/2253; H04N 5/335; H04N 5/378
USPC ................ 359/755, 751, 713, 676, 682, 683
See application file for complete search history.

(56) References Cited

U.S. PATENT DOCUMENTS

| | | |
|---|---|---|
| 2008/0218875 A1 | 9/2008 | Kuroda |
| 2016/0054550 A1 | 2/2016 | Bito |
| 2016/0252712 A1* | 9/2016 | Uchida ................ G02B 15/173 359/557 |
| 2016/0349492 A1* | 12/2016 | Maetaki ................ G02B 15/22 |

FOREIGN PATENT DOCUMENTS

JP 2015-169931 A 9/2015

* cited by examiner

*Primary Examiner* — Jie Lei
(74) *Attorney, Agent, or Firm* — Canon U.S.A., Inc. IP Division

(57) ABSTRACT

A zoom lens including a first lens unit that has a positive refractive power, a second lens unit that has a negative refractive power, and at least one lens unit, in which the first lens unit, the second lens unit, and at least one lens unit are disposed from an object side to an image side in the above order. The first lens unit is formed of a single piece of lens element, and the zoom lens includes a positive lens on a side closest to an image. An Abbe number of the positive lens, back focuses at a wide angle end and a telescopic end, and focal lengths of the zoom lens at the wide angle end and the telescopic end are each set appropriately.

12 Claims, 17 Drawing Sheets

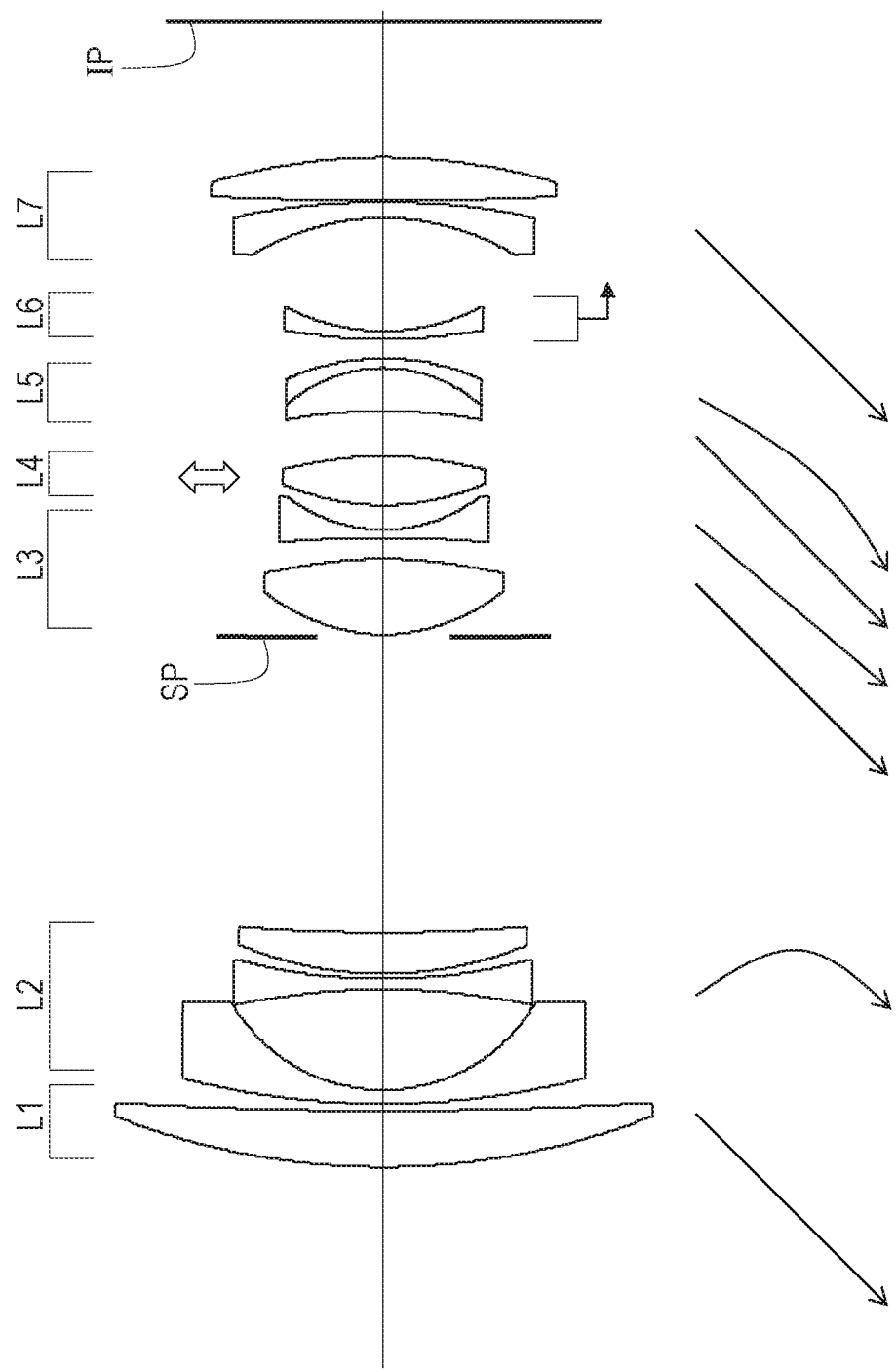

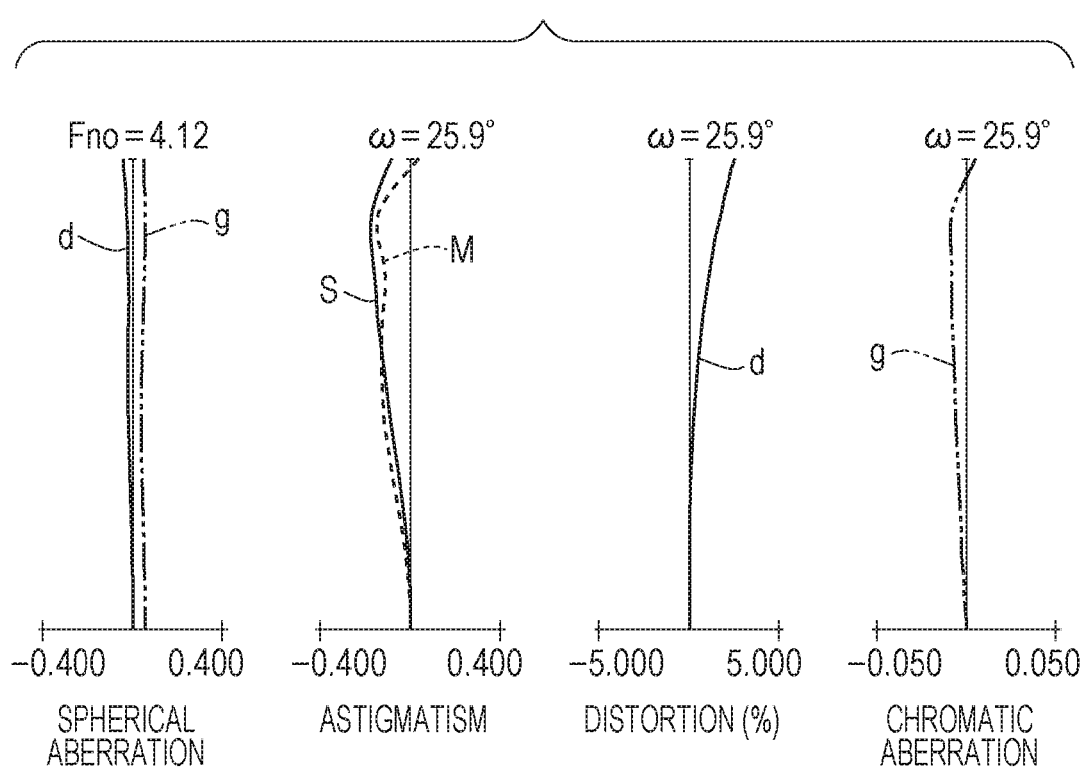

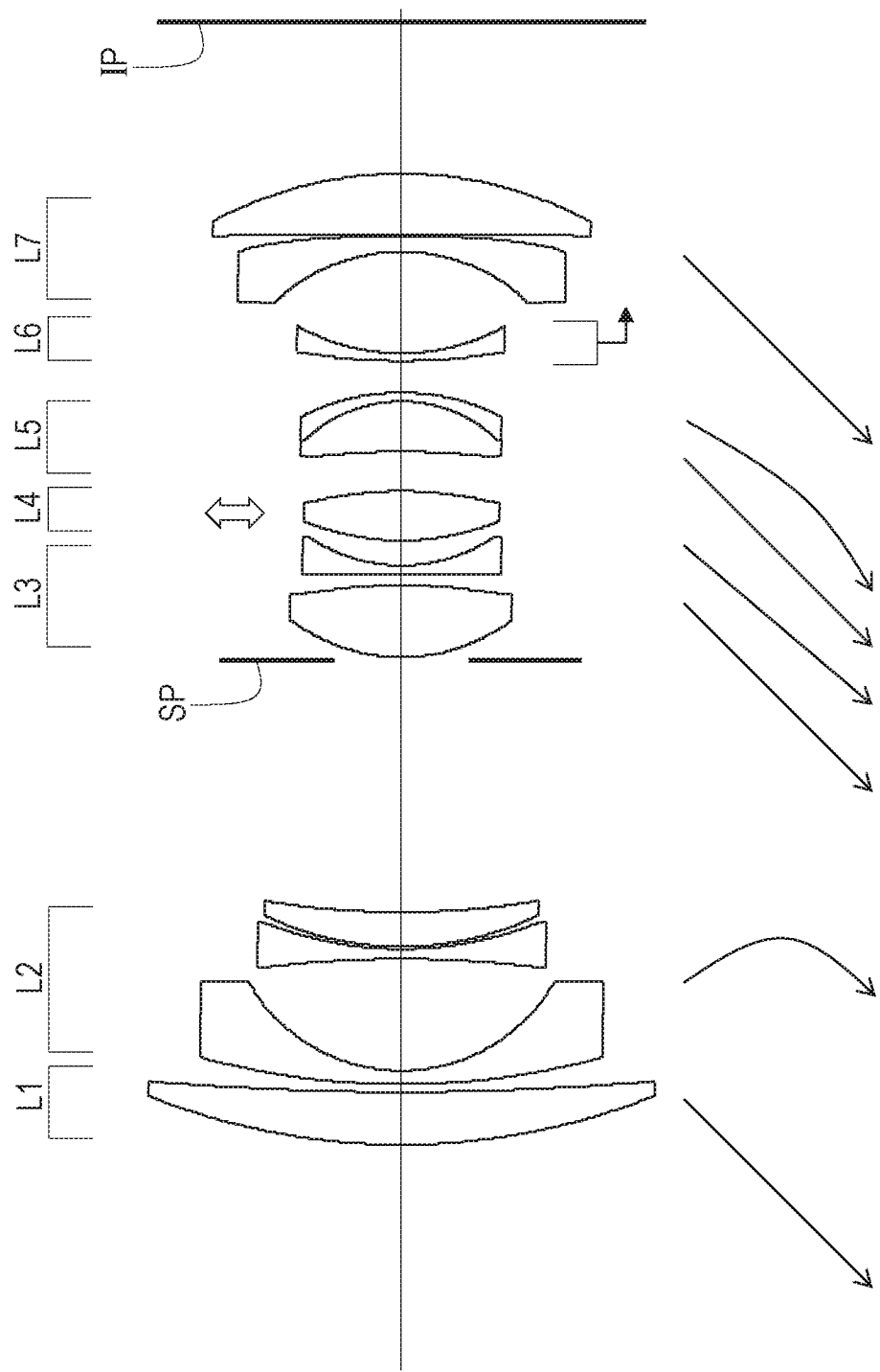

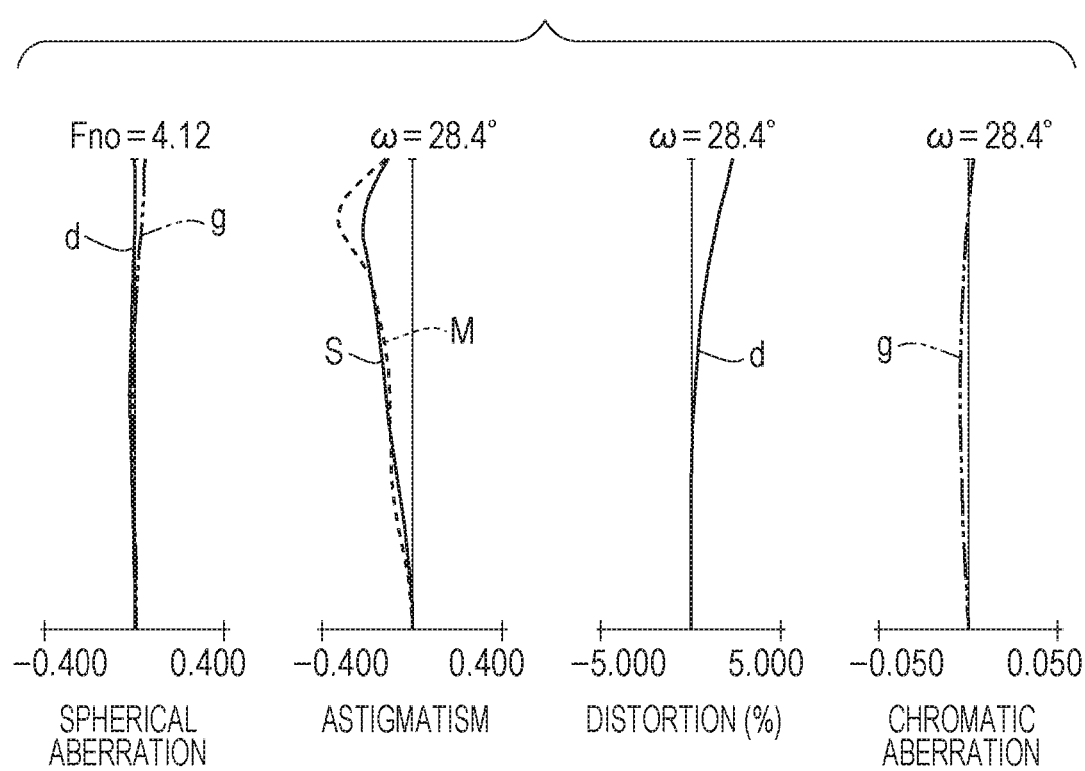

ZOOM LENS AND IMAGE PICKUP APPARATUS INCLUDING SAME

BACKGROUND OF THE INVENTION

Field of the Invention

The present disclosure relates to a zoom lens suitable for a digital camera, a video camera, and the like, and to an image pickup apparatus including the same.

Description of the Related Art

In an image pickup apparatus including an image pickup element, such as a digital camera, a zoom lens that is small in size and that has a high zoom ratio while having little chromatic aberration in the whole zoom area is in need.

Hitherto, a zoom lens that includes, in order the from an object side to an image side, a first lens unit that has a positive refractive power, a second lens unit that has a negative refractive power, and at least one lens unit has been proposed. The size of the zoom lens is reduced by having the first lens unit be formed of a single piece of positive lens (U.S. Patent Application Publication No. 2008/0218875 and No. 2016/0054550, and Japanese Patent Laid-Open No. 2015-169931).

SUMMARY OF THE INVENTION

A zoom lens including a first lens unit that has a positive refractive power, a second lens unit that has a negative refractive power, and at least one lens unit. In the zoom lens, the first lens unit, the second lens unit, and the at least one lens unit are disposed from an object side to an image side in an order of the first lens unit, the second lens unit, and the at least one lens unit, a distance between lens units that are adjacent to each other changes when zooming, the first lens unit is formed of a single piece of lens element, the zoom lens includes a positive lens on a side closest to an image, and the following conditional expressions $$15.0 < vdp < 30.0$$

$$0.96 < (skt/skw)/(ft/fw) < 2.0$$

are satisfied, where vdp is an Abbe number of the positive lens, skw is back focus at a wide angle end, skt is back focus at a telescopic end, fw is focal length of the zoom lens at the wide angle end, and ft is focal length of the zoom lens at the telescopic end.

Further features of the disclosure will become apparent from the following description of exemplary embodiments with reference to the attached drawings.

BRIEF DESCRIPTION OF THE DRAWINGS

FIG. 3 is a cross-sectional view of lenses of a zoom lens of a second embodiment at a wide angle end.

FIGS. 4A to 4C are aberration diagrams of the zoom lens of the second embodiment.

FIG. 7 is a cross-sectional view of lenses of a zoom lens of a fourth embodiment at a wide angle end.

FIGS. 8A to 8C are aberration diagrams of the zoom lens of the fourth embodiment.

DESCRIPTION OF THE EMBODIMENTS

Figure 1:
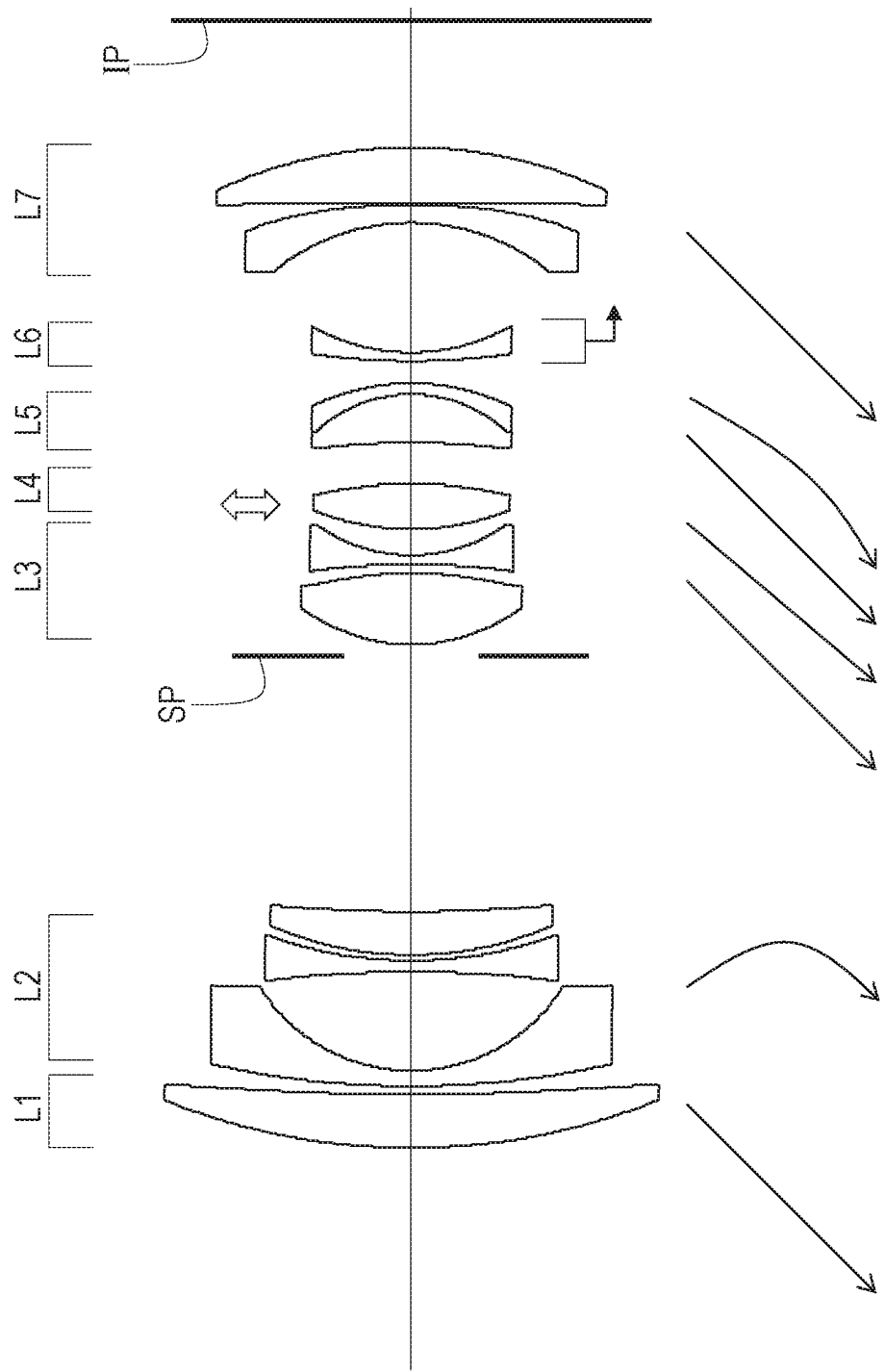
FIG. 1 is a cross-sectional view of lenses of a zoom lens of a first embodiment at a wide angle end.
Figure 2A:
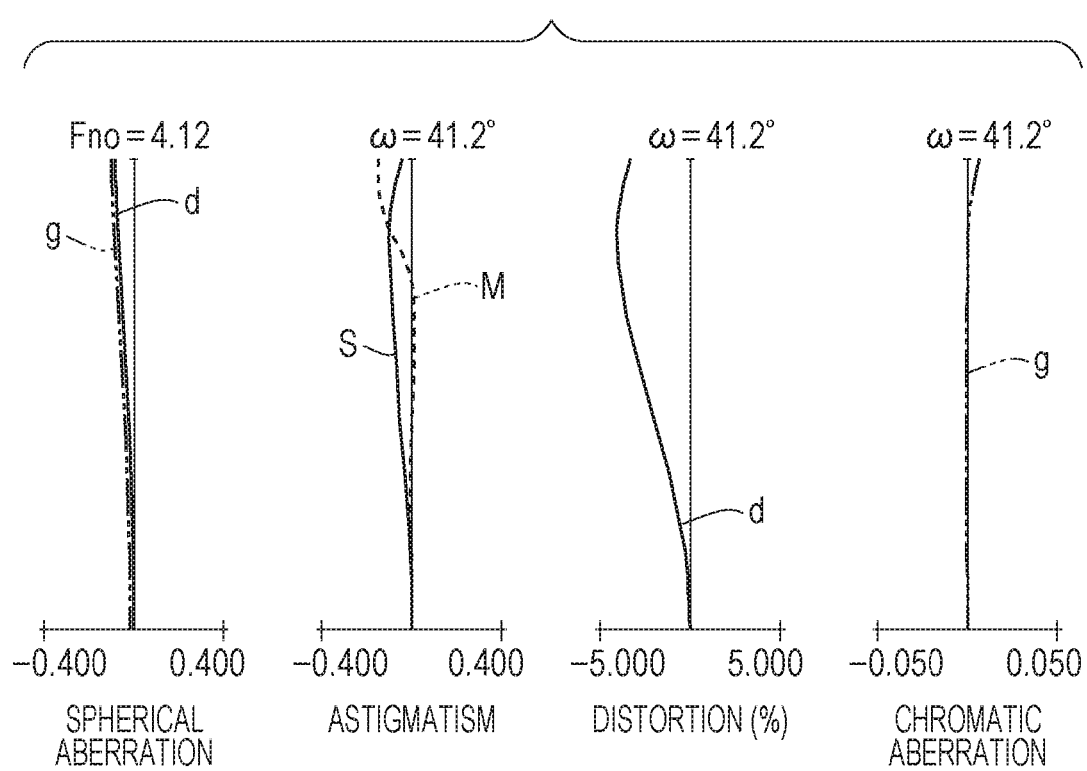
FIGS. 2A to 2C are aberration diagrams of the zoom lens of the first embodiment.
Figure 2B:
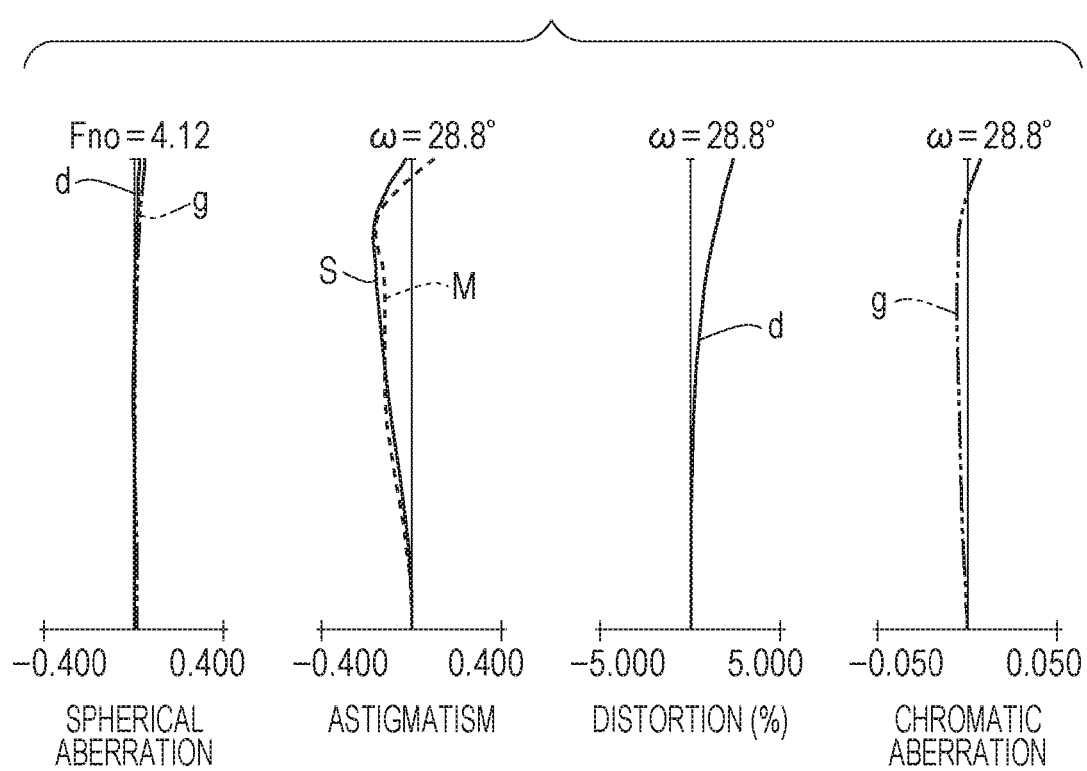
Figure 2C:
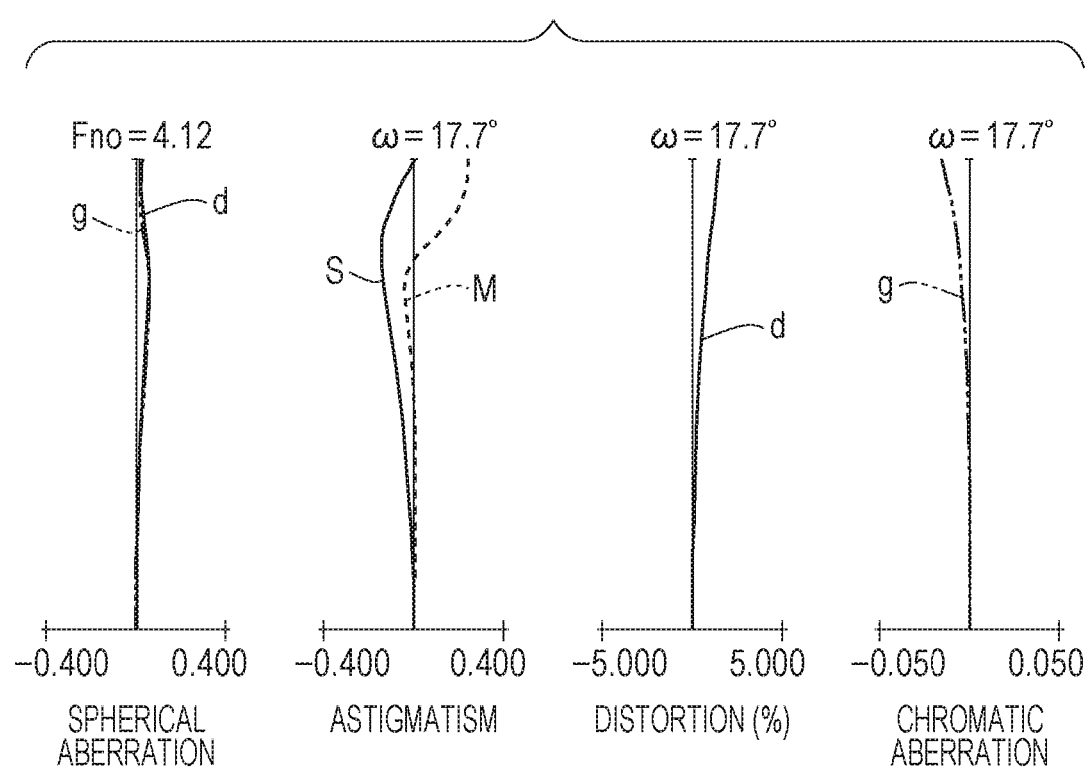
Figure 4A:
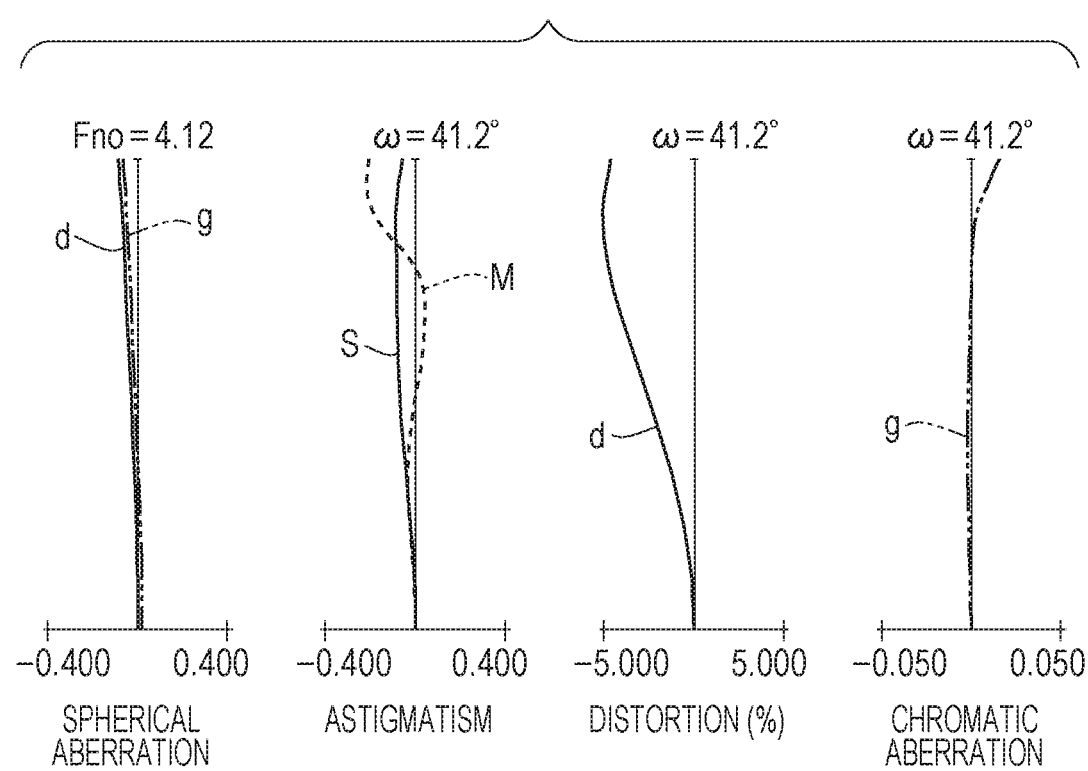
Figure 4C:
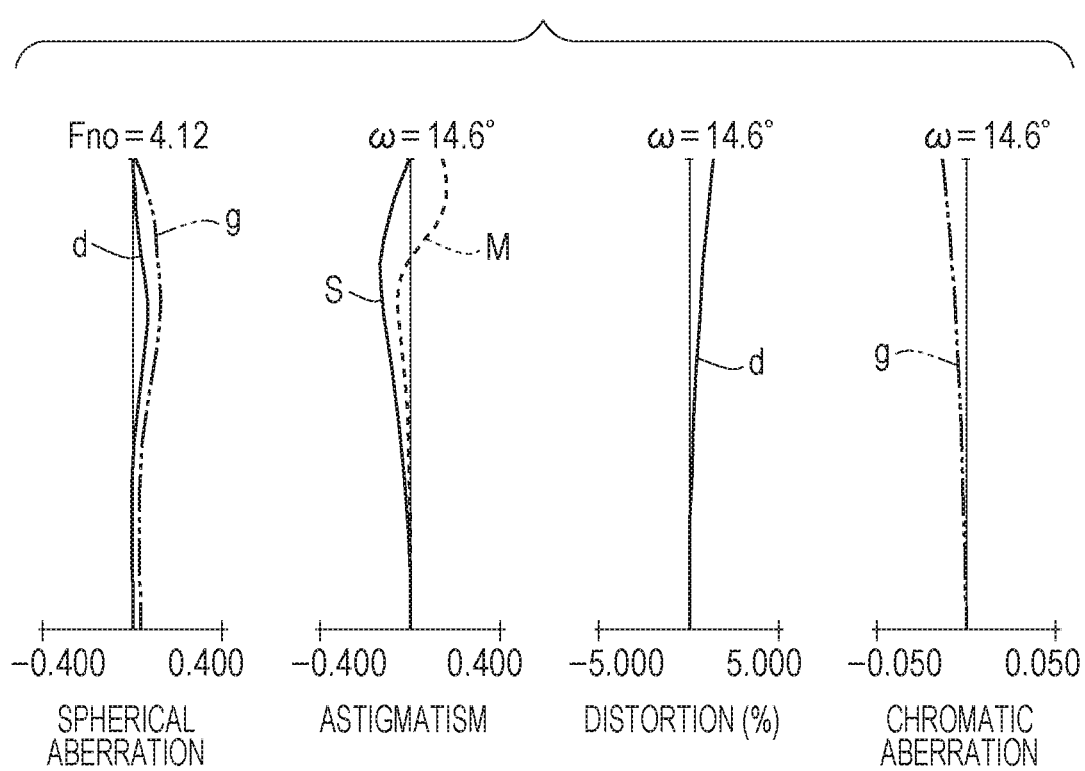
Figure 5:
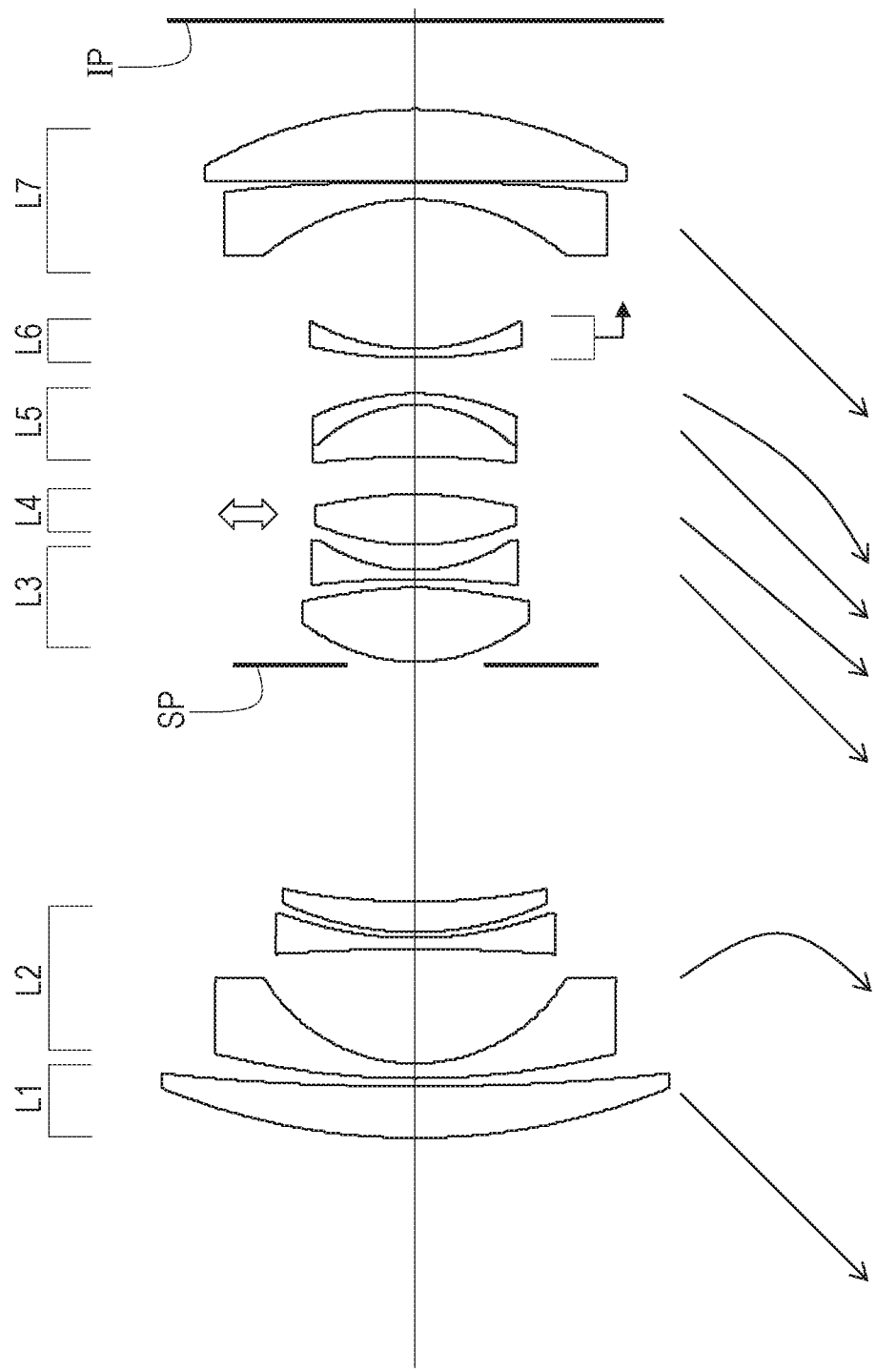
FIG. 5 is a cross-sectional view of lenses of a zoom lens of a third embodiment at a wide angle end.
Figure 6A:
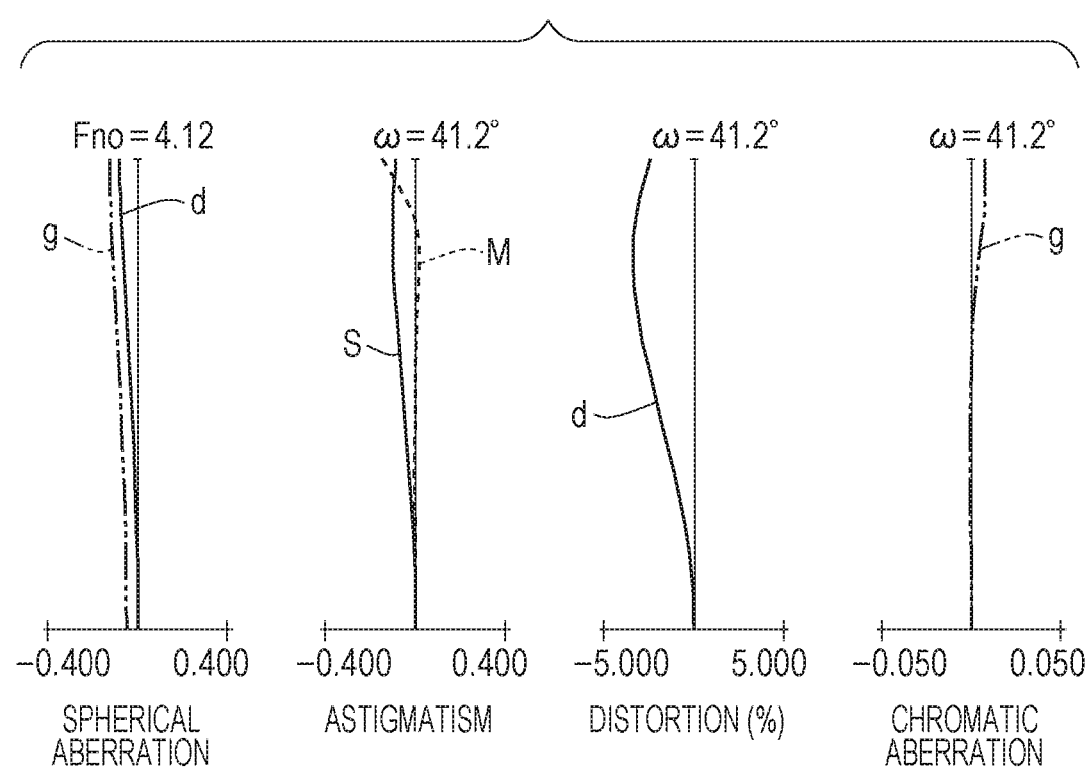
FIGS. 6A to 6C are aberration diagrams of the zoom lens of the third embodiment.
Figure 6B:
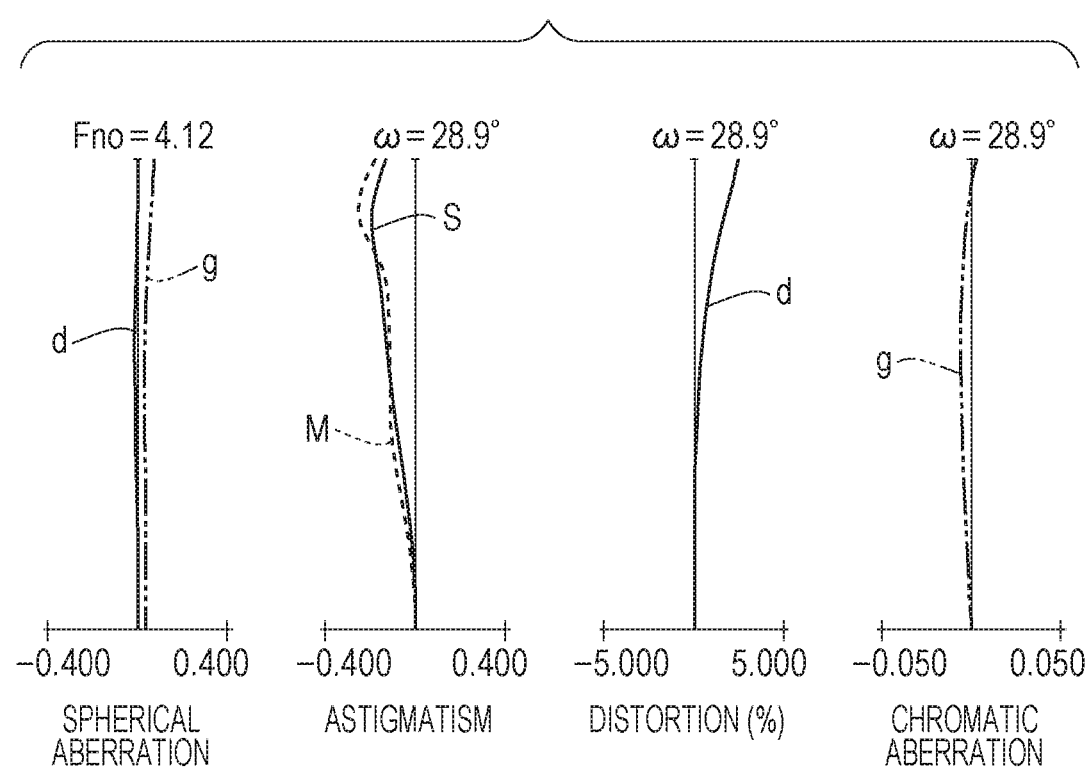
Figure 6C:
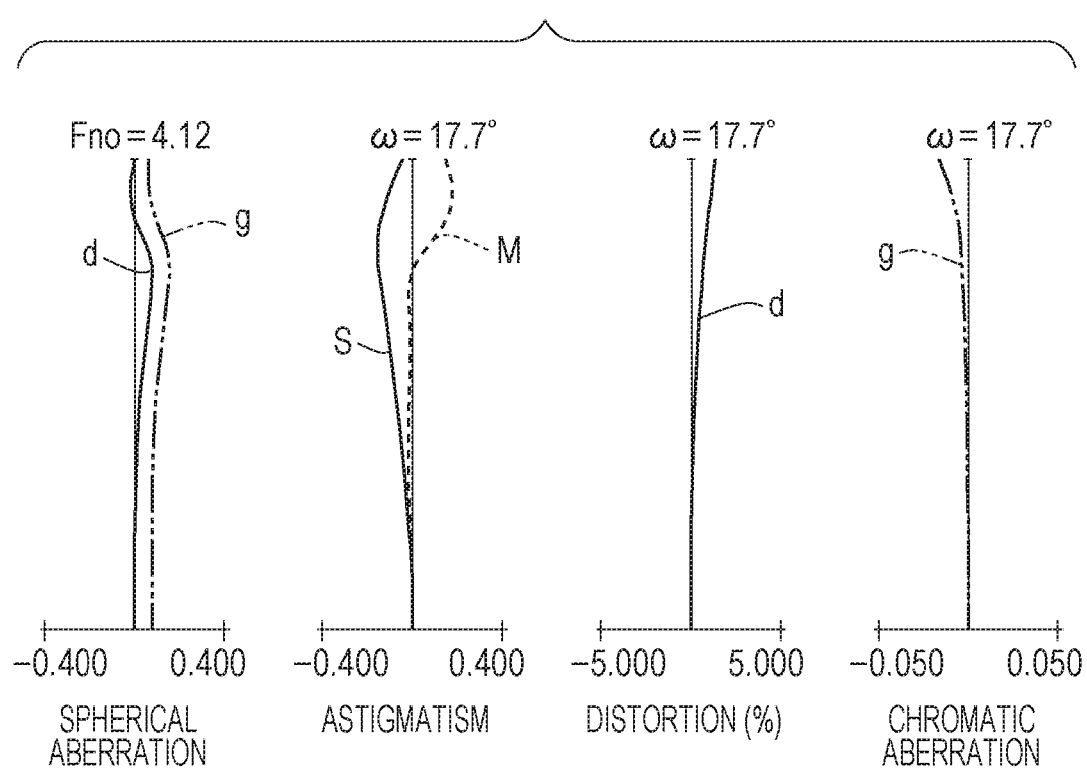
Figure 8A:
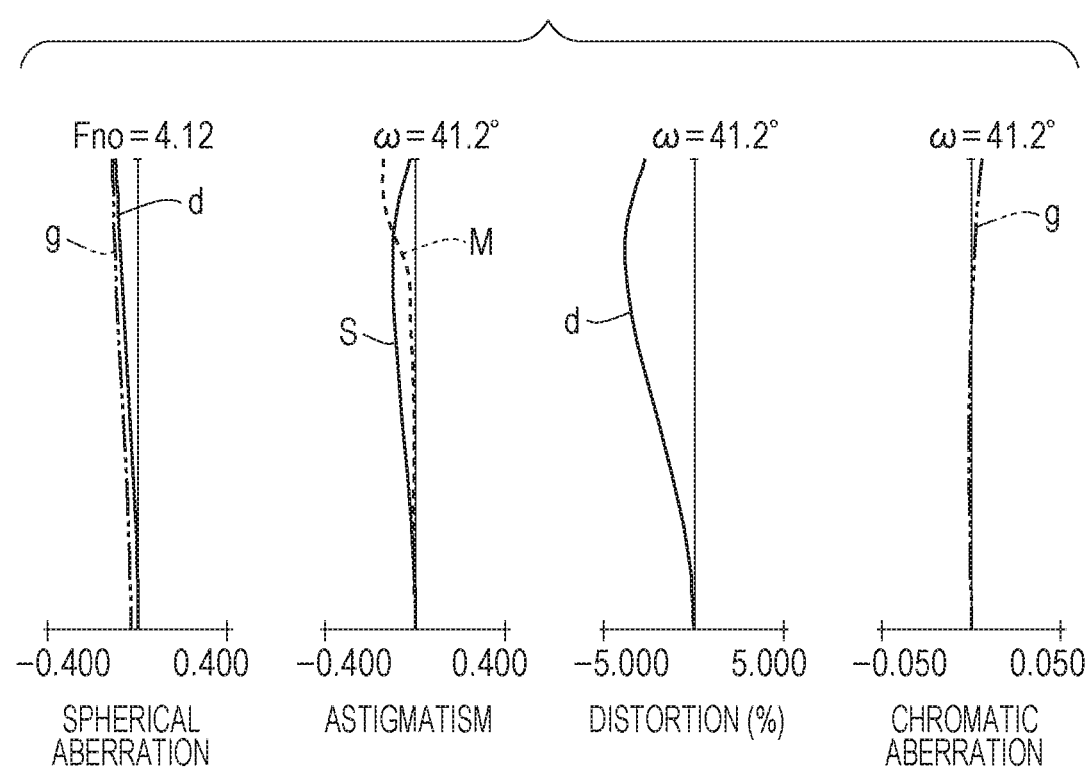
Figure 8C:
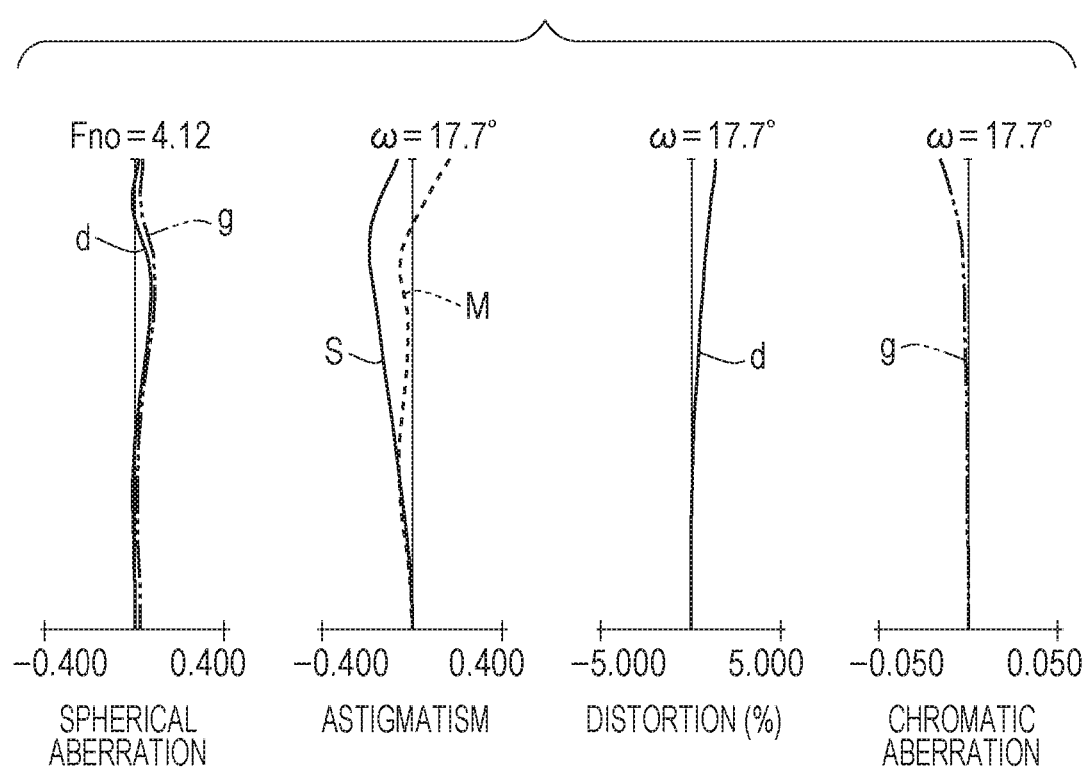

Hereinafter, embodiments of the present disclosure will be described with reference to the attached drawings.

A zoom lens of each embodiment is a zoom lens used in an image pickup apparatus, such as a digital camera, a video camera, or a silver halide camera. Note that the zoom lens of each embodiment can be also used as a projection optical system for a projection device (a projector).

In the cross-sectional views of the lenses in FIGS. 1, 3, 5, and 7, the left side is the object side (the front side) and the right side is the image side (the back side). Furthermore, in the cross-sectional views of the lenses, when assuming that i denotes the order of the lens unit from the object side, Li is the $i^{th}$ lens unit. SP denotes an aperture diaphragm. IP denotes an image plane. In a case in which the zoom lens is used in an image pickup apparatus, such as a digital camera or a video camera, the image plane IP is equivalent to an image pickup plane of a solid-state image pickup element (a photoelectric conversion element), such as a CCD sensor or a CMOS sensor. When the zoom lens is used in an image pickup apparatus of a silver-halide film camera, the image plane IP is equivalent to a film plane. When the zoom lens is used in a projector, the image plane IP is equivalent to an image forming plane in an image forming element, such as a liquid crystal panel. When zooming from a wide angle end to a telescopic end, each of the lens units moves in a manner illustrated by the arrows.

The arrow, which is related to the focus of the sixth lens unit L6, denotes a moving direction when focusing from infinity to a near distance.

In the aberration diagrams in FIGS. 2A to 2C, 4A to 4C, 6A to 6C, and 8A to 8C, FIGS. 2A, 4A, 6A, and 8A depict aberration diagrams at a wide angle end, FIGS. 2B, 4B, 6B, and 8B depict aberration diagrams at an intermediate zooming position, and FIGS. 2C, 4C, 6C, and 8C depict aberration diagrams at a telescopic end.

In the spherical aberration diagrams, Fno is an F-number. Furthermore, d is a d-line (a wavelength of 587.6 nm), and g is a g-line (a wavelength of 435.8 nm). In the astigmatism diagrams, M is a meridional image plane of a d-line, S is a sagittal image plane of a d-line. Distortion aberration diagrams each depict a d-line. Magnification chromatic aberration diagrams each depict a g-line. Sign ω is a half angle of field (degrees).

In a zoom lens, in order to obtain a zoom lens that has a satisfactory optical characteristic while being small in size and having a high zoom ratio, the elements constituting the zoom lens are to be set appropriately. Particularly, in order to favorably correct the chromatic aberration throughout the entire zoom range, it is important to appropriately select the optical material and appropriately set the position of the lens.

The zoom lenses according to the embodiments of the present disclosure include, from the object side to the image side, a first lens unit that has a positive refractive power, a second lens unit that has a negative refractive power, and at least one lens unit in that order. Furthermore, distances between adjacent lens units change when zooming.

If the refractive power of the first lens unit that has a positive refractive power and that is disposed on the side closest to the object is increased, a telephoto-type refractive power arrangement will be obtained, which is advantageous in reducing the entire length of the zoom lens. However, if the refractive power of the first lens unit is increased, the number of lenses in the first lens unit will increase and the first lens unit will become thick. If the first lens unit is thick, the angle of the off axial ray incident to the first lens unit is large at the wide angle end, and the effective diameter of the lenses constituting the first lens unit will become large as well. Accordingly, in order to reduce the size of the zoom lens, it is important to reduce the number of lenses constituting the first lens unit.

The zoom lens according to the embodiment of the present disclosure includes, on the side closest to the object, a first lens unit L1 that has a positive refractive power, and the reduction in size of the zoom lens is achieved by configuring the first lens unit with a single piece of lens element.

When the first lens unit is configured with a single piece of lens element, an issue will occur in correcting the magnification chromatic aberration that occurs in the first lens unit. In order to favorably correct the magnification chromatic aberration in the whole zoom area, the value of the coefficient of chromatic aberration of magnification of the entire system in the whole zoom area is to be small. A coefficient T of chromatic aberration of magnification is expressed as $T=\Sigma(hn \cdot hbn \cdot \varphi n/\nu n)$, where the refractive power of the lens is $\varphi n$, the incident height of the axial ray is hn, the incident height of the off-axial principal ray is hbn, and the Abbe number is $\nu n$.

The coefficient of chromatic aberration of magnification is proportional to the incident height hn of the axial ray, and the sign thereof changes according to the sign of the incident height hbn of the off-axial principal ray. In particular, when focusing on the coefficient of chromatic aberration of magnification of the first lens unit, when the power is varied from the wide angle end to the telephoto end, the absolute value of the incident height hn of the axial ray of the lens on the side closest to the object becomes large in proportion to the focal length, and the sign of the off-axial principal ray becomes negative. On the other hand, in a case in which the positive lens is disposed on the image side with respect to the diaphragm, the sign of the off-axial principal ray becomes positive. Accordingly, by disposing the positive lens on the image side with respect to the diaphragm, the magnification chromatic aberration occurring in the first lens unit can be corrected.

Furthermore, when the lens is disposed on the side in the zoom lens that is closest to the image, increase in the light ray height of the axial ray passing the lens is in proportion to the back focus. Accordingly, the magnification chromatic aberration occurring in the first lens unit can be corrected by moving the positive lens to the object side so that the positive lens is disposed on the side that is closest to the image in the zoom lens and so that the back focus increases when varying the power from the wide angle end to the telescopic end.

The present disclosure is characterized in that the zoom lens according to the embodiment of the present disclosure includes a positive lens on the side closest to the image, and that the following conditional expressions are satisfied.

$$15.0 < \nu dp < 30.0 \quad (1)$$

$$0.96 < (skt/skw)/(ft/fw) < 2.00 \quad (2)$$

Note that $\nu dp$ is the Abbe number of the positive lens disposed on the side that is closest to the image in the zoom lens. Furthermore, skw is back focus at a wide angle end, skt is back focus at a telescopic end, fw is focal length of the zoom lens at the wide angle end, and ft is focal length of the zoom lens at the telescopic end.

Note that back focus is a distance (an air conversion length) along the optical axis from a lens surface on the image side of the lens that is positioned on the side closest to the image to the image plane.

Conditional expression (1) relates to the Abbe number of the positive lens that is disposed on the side closest to the image in the zoom lens. By using a material that has a large dispersion in the positive lens disposed on the side closest to the image, appropriate correction of the magnification chromatic aberration occurring in the first lens unit can be facilitated. It may not be desirable for the dispersion to become small exceeding the upper limit of conditional expression (1), since it will be difficult to correct the magnification chromatic aberration occurring in the first lens unit, and the magnification chromatic aberration becomes greatly fluctuated when zooming. While it may be advantageous in correcting the magnification chromatic aberration, it may not be desirable for the dispersion become large falling below the lower limit of conditional expression (1), since the sensitivities against the chromatic aberration, which is generated by decentering between the first lens unit L1 and the positive lens disposed on the side closest to the image, become excessively large and manufacturing becomes difficult.

Conditional expression (2) is a conditional expression that appropriately corrects the magnification chromatic aberration that has occurred in the first lens unit with the positive lens disposed on the side closest to the image. As described above, when varying the power from the wide angle end to the telescopic end, the magnification chromatic aberration that occurs in the first lens unit becomes large in proportion to the focal length. Meanwhile, the magnification chromatic aberration that occurs in the positive lens disposed on the side closest to the image becomes large in proportion to the back focus. Accordingly, by appropriately setting a ratio (a zoom ratio) between the focal length of the zoom lens at the wide angle end and that at the telescopic end, and the ratio between the back focus at the wide angle end and that at the telescopic end, an appropriate correction of the magnification chromatic aberration in the whole zoom area is facilitated. It may not be desirable that the ratio of the back focus becomes small falling below the lower limit of conditional expression (2), since correction of the magnification chromatic aberration with the positive lens that has been disposed on the side closest to the image becomes insufficient, and the fluctuation of the magnification chromatic aberration due to zooming becomes large. It may not be desirable that the ratio of the back focus becomes large exceeding the upper limit in conditional expression (2) since the back focus at the wide angle end becomes excessively small.

In one embodiment, the ranges of the numerical values of conditional expressions (1) and (2) are set in the following manner.

$$17.0 < \nu dp < 28.5 \quad (1a)$$

$$1.05 < (skt/skw)/(ft/fw) < 1.90 \quad (2a)$$

In another embodiment, the ranges of the numerical values of conditional expressions (1) and (2) are set in the following manner.

$$19.0 < \nu dp < 27.0 \quad (1b)$$

$$1.10 < (skt/skw)/(ft/fw) < 1.80 \quad (2b)$$

As described above, according to one of the embodiments of the present disclosure, a zoom lens that has a satisfactory optical characteristic while being small in size and having a high zoom ratio can be obtained.

In one embodiment, the zoom lens according to one of the embodiments of the present disclosure satisfies at least one of the following conditional expressions.

$$3.0 < f1/f2 < 6.0 \quad (3)$$

$$0.5 < fp/fw < 2.5 \quad (4)$$

$$2.0 < f1/fw < 7.4 \quad (5)$$

$$0.32 < f2/ft < 0.50 \quad (6)$$

$$3.0 < lw/fw < 6.0 \quad (7)$$

$$0.161 < t1/fw < 0.285 \quad (8)$$

Note that f1 is a focal length of the first lens unit, and f2 is a focal length of the second lens unit. Furthermore, fp is the focal length of the positive lens that has been disposed on the side closest to the image in the zoom lens, and fw and ft are focal lengths the zoom lens at the wide angle end and the telescopic end, respectively. Moreover, lw is a distance along the optical axis at the wide angle end from the surface of the zoom lens on the side that is closest to the object to the image plane, and t1 is a distance along the optical axis from the surface of the first lens unit on the side that is closest to the object to the surface of the first lens unit on the side that is closest to the image.

Conditional expression (3) is related to the ratio between the focal length of the first lens unit and the focal length of the second lens unit. Since the entire length becomes long, it may not be desirable that the focal length of the first lens unit becomes long exceeding the upper limit of conditional expression (3), or the focal length of the second lens unit becomes short. Since the back focus becomes short, it may not be desirable that the focal length of the first lens unit becomes short falling below the lower limit of conditional expression (3), or the focal length of the second lens unit becomes long.

Conditional expression (4) relates to the focal length of the positive lens that has been disposed on the side closest to the image. It may not be desirable that the focal length of the positive lens becomes long exceeding the upper limit of conditional expression (4), since the correction of the magnification chromatic aberration becomes insufficient, and the fluctuation of the magnification chromatic aberration becomes large during zooming. It may not be desirable that the focal length of the positive lens becomes short falling below the lower limit of conditional expression (4) since manufacturing sensitivity becomes high.

Conditional expression (5) relates to the focal length of the first lens unit. It may not be desirable that the focal length of the first lens unit becomes long exceeding the upper limit of conditional expression (5) since the moving distance of the first lens unit when zooming becomes exceedingly large and the size of the zoom lens becomes large. It may not be desirable that the focal length of the first lens unit becomes short falling below the lower limit of conditional expression (5) since the shift of the magnification chromatic aberration that has occurred in the first lens unit becomes large when zooming and the correction becomes difficult.

Conditional expression (6) relates to the focal length of the second lens unit. It may not be desirable that the focal length of the second lens unit becomes long exceeding the upper limit of conditional expression (6) since the first lens unit is to be moved a lot towards the object side when zooming, and the effective diameter of the first lens unit becomes large. It may not be desirable that the focal length of the second lens unit becomes short falling below the lower limit of conditional expression (6) since fluctuation of the distortion aberration becomes large when zooming.

Conditional expression (7) relates to the ratio between the overall lens length and the focal length of the zoom lens at the wide angle end. It may not be desirable that the overall lens length becomes long exceeding the upper limit of conditional expression (7) since the effective diameter of the lens constituting the first lens unit becomes large. It may not be desirable that the overall lens length becomes short falling below the lower limit of conditional expression (7) since the correction of the spherical aberration and the field curvature becomes difficult.

Conditional expression (8) relates to a ratio between the thickness of the first lens unit and the focal length of the zoom lens at the wide angle end. It may not be desirable that the overall thickness of the first lens unit becomes large exceeding the upper limit of conditional expression (8) since the effective diameter of the lens constituting the first lens unit becomes large. It may not be desirable that the first lens unit becomes thin falling below the lower limit of conditional expression (8) since the refractive power of the first lens unit becomes weak or a thickness (an edge thickness) of an outer peripheral portion of the lens becomes too thin making manufacturing difficult.

In one embodiment, the ranges of the numerical values of conditional expressions (3) to (8) are set in the following manner.

$$3.5 < f1/f2 < 5.8 \quad (3a)$$

$$0.6 < fp/fw < 2.4 \quad (4a)$$

$$2.5 < f1/fw < 7.0 \quad (5a)$$

$$0.33 < f2/ft < 0.45 \quad (6a)$$

$$3.3 < lw/fw < 5.5 \quad (7a)$$

$$0.165 < t1/fw < 0.265 \quad (8a)$$

In another embodiment, the ranges of the numerical values of conditional expressions (3) to (8) are set in the following manner.

$$3.8 < f1/f2 < 5.6 \quad (3b)$$

$$0.8 < fp/fw < 2.3 \quad (4b)$$

$$3.0 < f1/fw < 6.6 \quad (5b)$$

$$0.33 < f2/ft < 0.40 \quad (6b)$$

$$3.6 < lw/fw < 5.0 \quad (7b)$$

$$0.170 < t1/fw < 0.245 \quad (8b)$$

Furthermore, when the angle of ray incident on the image pickup element at a peripheral portion of an image area becomes large, the peripheral brightness decreases and shading and color displacement occur. Accordingly, in a digital camera lens, the degree of parallelization (telecentricity) against an optical axis of a principle ray on the image side of the lens is to be considered. In order to obtain telecentricity, it is effective to dispose the positive lens on the image side. With the convergence effect of the positive lens disposed on the image side of the lens, telecentricity is readily obtained. Sufficient telecentricity is obtained in the embodiments by disposing the positive lens on the side that is closest to the image.

The zoom lens in each embodiment includes at least a lens unit on the image side of the second lens unit. Specifically, the lens unit includes a third lens unit having a positive refractive power, a fourth lens unit having a positive refractive power, a fifth lens unit having a positive refractive power, the sixth lens unit having a negative refractive power, and a seventh lens unit having a positive refractive power.

The sixth lens unit having a negative refractive power moves to the image side when focusing from infinity to close range. When focusing, by moving the lens unit disposed on the image side with respect to the second lens unit, reduction in the lens diameter is facilitated and the size of the zoom lens can be reduced.

Furthermore, by disposing a lens unit having a negative refractive power on the image side of an aperture diaphragm SP, the overall zoom lens can have a telephoto-type refractive power arrangement, and the overall lens length can be shortened.

In each embodiment, the sixth lens unit that moves when focusing is constituted by a single lens element. With the above, the lens unit (a focus lens unit) that moves when focusing can be reduced in weight, and the load when driving the focus lens unit can be reduced; accordingly, the size of the zoom lens can be reduced. Furthermore, by configuring the focus lens unit with the single lens element that has a negative refractive power, the on-axis chromatic aberration occurring in the first lens unit and the positive lens that has been disposed on the side closest to the image can be corrected.

Furthermore, there is a demand for an image stabilization function that corrects blurring of the imaging image when there is a vibration such as a camera shake and the like. In the zoom lens of each embodiment, image blurring can be reduced by driving some of the lens unit in a direction containing a component perpendicular to the optical axis. In the zoom lens of each embodiment, by moving the fourth lens unit having a positive refractive power in a direction containing a component perpendicular to the optical axis, image blurring can be reduced. The fourth lens unit that is a lens unit (a vibration control lens unit) that moves when correcting image blurring is constituted by a single lens element. By reducing the weight of the vibration control lens unit, the drive unit that drives the vibration control lens unit can be reduced in size, and the zoom lens can be reduced in size.

In the zoom lens of each embodiment, when zooming from the wide angle end to the telescopic end, the distances of adjacent lens units change. In each embodiment, by changing the distances in front of and behind the vibration control lens unit and the focus lens unit, further reduction in aberration fluctuation that occurs when zooming is achieved.

While the embodiments of the zoom lens of the present disclosure have been described above, it goes without saying that the present disclosure is not limited to the embodiments, and various deformations and modifications can be made within the gist thereof. For example, when zooming, the third lens unit, the fourth lens unit, and the fifth lens unit can be moved in an integrated manner to simplify the drive mechanism.

Figure 9:
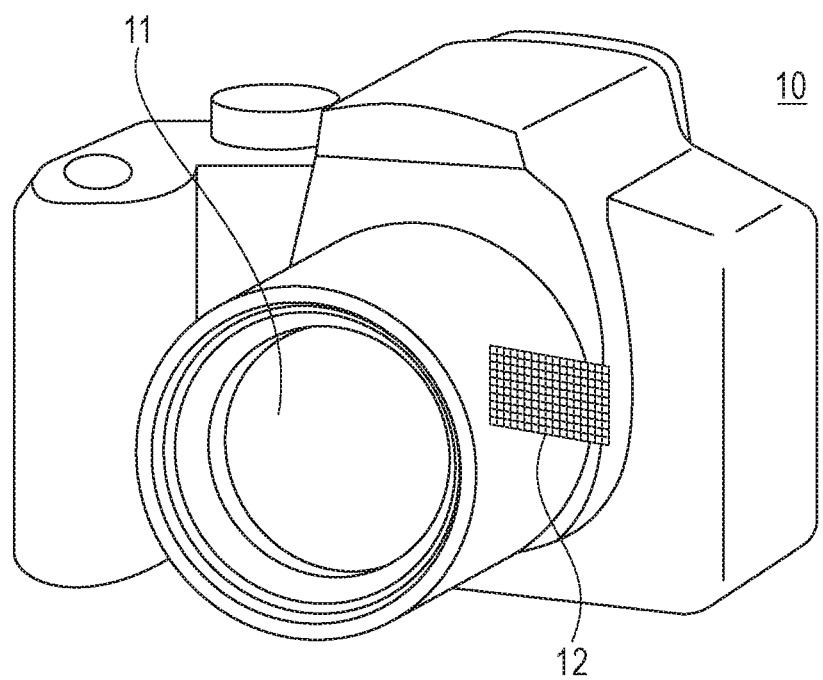
FIG. 9 is a schematic diagram illustrating a portion of an image capturing apparatus.

Embodiments of a digital camera (an image pickup apparatus) that uses the zoom lens according to the embodiments of the present disclosure as the image pickup optical system will be described with reference to FIG. 9. In FIG. 9, a camera body 10 includes an image pickup optical system constituted by one of the zoom lenses of the embodiments described above. An image pickup element 12, built in the camera body 10, is a CCD sensor or a CMOS sensor that receives light of the image of the subject formed by an image pickup optical system 11.

Note that the present disclosure can be applied, in a similar manner, to a single lens reflex (SLR) camera that has no quick-return mirror. Furthermore, the zoom lens of the present disclosure can be applied to a video camera in a similar manner.

Hereinafter, specific numerical data of first to fourth numerical embodiments corresponding to the first to fourth embodiments will be set forth. In each numerical embodiment, i denotes the order of the surface from the object side. In each numerical embodiment, r denotes a radius of curvature of the lens surface, d denotes a lens thickness or an air distance, and nd and vd denote an index of refraction and an Abbe number, respectively, of the lens material. BF denotes a back focus.

The aspheric shape is expressed by the following formula, where the X-axis extends in the optical axis direction, H axis extends in a direction perpendicular to the optical axis, the proceeding direction of the light is positive, R is the paraxial curvature radius, and K, A2, A4, A6, A8, A10, A12 are each an aspheric surface coefficient.

$$X = \frac{(1/R)}{1+\sqrt{1-(1+K)(H/R)^2}} + A_2H^2 + \\ A_4H^4 + A_6H^6 + A_8H^8 + A_{10}H^{10} + A_{12}H^{12}$$

[Math. 1]

The symbol * indicates an aspherical surface. In each aspheric surface coefficient, "e-x" represents "$10^{-x}$". Furthermore, the overall lens length is a value that is a sum of the distance along the optical axis from the lens surface closest to the object side to the lens surface closest to the image and the back focus BF. The back focus BF represents a length (an air conversion length) from the lens surface closest to the image to the image plane. Furthermore, regarding the numerical embodiments, Table 1 indicates the numerical value corresponding to conditional expressions described above.

| First Numerical Embodiment | | | | |
| --- | --- | --- | --- | --- |
| Surface Data | | | | |
| Surface Number | r | d | nd | vd |
| 1 | 59.366 | 4.85 | 1.72916 | 54.7 |
| 2 | 264.531 | (Variable) | | |
| 3 | 81.694 | 1.40 | 1.90043 | 37.4 |
| 4 | 16.034 | 8.92 | | |
| 5 | −102.984 | 1.00 | 1.59522 | 67.7 |
| 6 | 37.985 | 0.50 | | |
| 7 | 31.566 | 3.89 | 2.00069 | 25.5 |
| 8 | 136.147 | (Variable) | | |
| 9 (Diaphragm) | ∞ | 1.00 | | |
| 10* | 16.022 | 6.42 | 1.58313 | 59.5 |
| 11* | −32.008 | 0.81 | | |
| 12 | −64.027 | 0.80 | 1.53172 | 48.8 |
| 13 | 14.474 | (Variable) | | |
| 14 | 23.234 | 4.16 | 1.49710 | 81.6 |
| 15* | −31.330 | (Variable) | | |
| 16 | −70.257 | 4.36 | 1.69350 | 53.2 |

-continued

First Numerical Embodiment

| | | | | |
|---|---|---|---|---|
| 17 | −12.679 | 1.00 | 2.00069 | 25.5 |
| 18 | −20.377 | (Variable) | | |
| 19 | 59.904 | 0.80 | 1.95375 | 32.3 |
| 20 | 18.402 | (Variable) | | |
| 21 | −19.606 | 1.60 | 1.58313 | 59.4 |
| 22* | −60.776 | 0.15 | | |
| 23 | −838.394 | 5.02 | 1.92286 | 20.9 |
| 24 | −41.738 | (Variable) | | |
| Image Plane | ∞ | | | |

Aspherical Surface Data

10th Surface

K = 0.00000e+000 A 4 = −1.39681e−005 A 6 = −9.94600e−009
A 8 = −4.32812e−010 A10 = 2.18825e−012

11th Surface

K = 0.00000e+000 A4 = 4.25800e−005 A6 = −1.32388e−007
A8 = 4.29502e−010 A10 = 2.79238e−013

15th Surface

K = 0.00000e+000 A4 = 2.56431e−005 A6 = 1.30909e−007
A8 = −1.51007e−009 A10 = 7.72682e−012

22nd Surface

K = 0.00000e+000 A4 = −8.00112e−006 A6 = −7.13984e−009
A8 = 2.00109e−011 A10 = −2.96168e−013

Various Data
Zoom Ratio 2.75

| | Wide Angle | Intermediate | Telephoto |
|---|---|---|---|
| Focal Length | 24.71 | 39.34 | 67.99 |
| F-number | 4.12 | 4.12 | 4.12 |
| Half Angle of Field | 41.20 | 28.81 | 17.65 |
| Image Height | 21.64 | 21.64 | 21.64 |
| Overall Lens Length | 101.65 | 109.71 | 131.94 |
| BF | 11.49 | 21.44 | 39.53 |
| d 2 | 0.70 | 11.10 | 24.09 |
| d 8 | 23.13 | 10.84 | 2.00 |
| d13 | 2.33 | 3.41 | 4.99 |
| d15 | 3.65 | 2.57 | 0.99 |
| d18 | 1.99 | 2.08 | 1.20 |
| d20 | 11.67 | 11.58 | 12.47 |
| d24 | 11.49 | 21.44 | 39.53 |

Zoom Lens Unit Data

| Unit | Starting Surface | Focal Length |
|---|---|---|
| 1 | 1 | 103.94 |
| 2 | 3 | −25.09 |
| 3 | 9 | 61.36 |
| 4 | 14 | 27.53 |
| 5 | 16 | 60.62 |
| 6 | 19 | −28.11 |
| 7 | 21 | 327.10 |

Second Numerical Embodiment
Surface Data

| Surface Number | r | d | nd | vd |
|---|---|---|---|---|
| 1 | 73.104 | 5.56 | 1.59282 | 68.6 |
| 2 | 458.385 | (Variable) | | |
| 3* | 80.590 | 1.40 | 1.85135 | 40.1 |
| 4 | 17.527 | 10.01 | | |
| 5 | −69.205 | 1.00 | 1.53775 | 74.7 |
| 6 | 55.753 | 0.55 | | |
| 7 | 37.210 | 4.09 | 1.84666 | 23.8 |
| 8 | 176.387 | (Variable) | | |

-continued

Second Numerical Embodiment

| | | | | |
|---|---|---|---|---|
| 9(Diaphragm) | ∞ | 0.30 | | |
| 10* | 17.464 | 7.51 | 1.59201 | 67.0 |
| 11* | −40.412 | 2.12 | | |
| 12 | −108.380 | 0.80 | 1.58267 | 46.4 |
| 13 | 15.625 | (Variable) | | |
| 14 | 24.623 | 4.89 | 1.49710 | 81.6 |
| 15* | −33.199 | (Variable) | | |
| 16 | −52.774 | 4.22 | 1.72916 | 54.7 |
| 17 | −14.579 | 1.00 | 2.00069 | 25.5 |
| 18 | −23.425 | (Variable) | | |
| 19 | 55.556 | 0.80 | 1.90043 | 37.4 |
| 20 | 20.873 | (Variable) | | |
| 21 | −25.210 | 1.60 | 1.62263 | 58.2 |
| 22* | −87.548 | 0.15 | | |
| 23 | 356.691 | 4.32 | 1.92286 | 20.9 |
| 24 | −58.359 | (Variable) | | |
| Image Plane | ∞ | | | |

Aspherical Surface Data

Third Surface

K = 0.00000e+000 A4 = 8.70600e−007 A6 = −3.30664e−009
A8 = 8.10284e−012 A10 = −8.21623e−015

10th Surface

K = 0.00000e+000 A 4 = −1.32652e−005 A 6 = −3.30890e−008
A 8 = 7.98028e−011 A10 = −1.14761e−012

11th Surface

K = 0.00000e+000 A4 = 2.53653e−005 A6 = −6.23597e−008
A8 = 1.56230e−010 A10 = −4.80820e−013

15th Surface

K = 0.00000e+000 A4 = 2.12233e−005 A6 = 4.34439e−008
A8 = −9.56978e−011 A10 = −1.80826e−013

22nd Surface

K = 0.00000e+000 A4 = −5.39899e−006 A6 = 4.73439e−010
A8 = −2.94271e−011 A10 = −3.65857e−014

Various Data
Zoom Ratio 3.36

| | Wide Angle | Intermediate | Telephoto |
|---|---|---|---|
| Focal Length | 24.72 | 44.55 | 82.99 |
| F-number | 4.12 | 4.12 | 4.12 |
| Half Angle of Field | 41.19 | 25.90 | 14.61 |
| Image Height | 21.64 | 21.64 | 21.64 |
| Overall Lens Length | 113.98 | 127.28 | 162.60 |
| BF | 13.50 | 27.08 | 51.57 |
| d 2 | 0.70 | 18.27 | 38.44 |
| d 8 | 29.39 | 11.54 | 2.19 |
| d13 | 2.43 | 4.17 | 5.83 |
| d15 | 4.50 | 2.76 | 1.10 |
| d18 | 1.90 | 2.96 | 1.19 |
| d20 | 11.24 | 10.17 | 11.95 |
| d24 | 13.50 | 27.08 | 51.57 |

Zoom Lens Unit Data

| Unit | Starting Surface | Focal Length |
|---|---|---|
| 1 | 1 | 145.93 |
| 2 | 3 | −27.53 |
| 3 | 9 | 65.20 |
| 4 | 14 | 29.26 |
| 5 | 16 | 84.77 |
| 6 | 19 | −37.54 |
| 7 | 21 | 497.91 |

Third Numerical Embodiment

Surface Data

| Surface Number | r | d | nd | vd |
|---|---|---|---|---|
| 1 | 58.432 | 4.48 | 1.80400 | 46.6 |
| 2 | 217.515 | (Variable) | | |
| 3 | 71.008 | 1.30 | 1.90043 | 37.4 |
| 4 | 15.359 | 9.94 | | |
| 5 | −178.801 | 1.00 | 1.49700 | 81.5 |
| 6 | 33.045 | 0.49 | | |
| 7 | 27.565 | 2.64 | 2.00069 | 25.5 |
| 8 | 60.146 | (Variable) | | |
| 9 (Diaphragm) | ∞ | 0.30 | | |
| 10* | 15.202 | 6.48 | 1.58313 | 59.5 |
| 11* | −31.166 | 0.72 | | |
| 12 | −77.075 | 0.80 | 1.62280 | 57.0 |
| 13 | 14.758 | (Variable) | | |
| 14 | 22.925 | 4.38 | 1.49710 | 81.6 |
| 15* | −31.451 | (Variable) | | |
| 16 | −73.189 | 4.50 | 1.72916 | 54.7 |
| 17 | −12.078 | 1.00 | 2.00069 | 25.5 |
| 18 | −20.348 | (Variable) | | |
| 19 | 42.266 | 0.80 | 2.00100 | 29.1 |
| 20 | 18.398 | (Variable) | | |
| 21* | −19.095 | 1.50 | 1.58313 | 59.5 |
| 22* | −232.858 | 0.15 | | |
| 23 | −1348.178 | 6.23 | 1.92286 | 20.9 |
| 24 | −36.044 | (Variable) | | |
| Image Plane | ∞ | | | |

Aspherical Surface Data

10th Surface

K = 0.00000e+000 A4 = −1.68203e−005 A6 = −7.09048e−010
A8 = −7.56893e−010 A10 = 5.08527e−012

11th Surface

K = 0.00000e+000 A4 = 4.89251e−005 A6 = −1.42739e−007
A8 = 2.54589e−010 A10 = 3.45598e−012

15th Surface

K = 0.00000e+000 A4 = 2.60000e−005 A6 = 1.52119e−007
A8 = −1.40250e−009 A10 = 6.25646e−012

21st Surface

K = 0.00000e+000 A4 = 1.33765e−005 A6 = −9.58993e−009
A8 = 4.94112e−011 A10 = 2.79758e−013

22nd Surface

K = 0.00000e+000 A4 = 7.54582e−007 A6 = −2.62611e−008
A8 = 6.76732e−011 A10 = −1.38692e−013

Various Data
Zoom Ratio 2.75

| | Wide Angle | Intermediate | Telephoto |
|---|---|---|---|
| Focal Length | 24.71 | 39.20 | 67.99 |
| F-number | 4.12 | 4.12 | 4.12 |
| Half Angle of Field | 41.21 | 28.89 | 17.65 |
| Image Height | 21.64 | 21.64 | 21.64 |
| Overall Lens Length | 97.27 | 106.19 | 129.21 |
| BF | 7.69 | 17.60 | 35.47 |
| d 2 | 0.70 | 10.68 | 23.47 |
| d 8 | 20.61 | 9.64 | 2.00 |
| d13 | 2.20 | 3.24 | 4.47 |
| d15 | 3.26 | 2.23 | 0.99 |
| d18 | 3.10 | 2.89 | 1.19 |
| d20 | 12.99 | 13.20 | 14.89 |
| d24 | 7.69 | 17.60 | 35.47 |

Zoom Lens Unit Data

| Unit | Starting Surface | Focal Length |
|---|---|---|
| 1 | 1 | 98.14 |
| 2 | 3 | −23.64 |
| 3 | 9 | 67.99 |
| 4 | 14 | 27.41 |
| 5 | 16 | 54.83 |
| 6 | 19 | −33.10 |
| 7 | 21 | 6306.95 |

Fourth Numerical Embodiment

Surface Data

| Surface Number | r | d | nd | vd |
|---|---|---|---|---|
| 1 | 60.263 | 4.64 | 1.72916 | 54.7 |
| 2 | 266.824 | (Variable) | | |
| 3 | 67.746 | 1.20 | 1.90043 | 37.4 |
| 4 | 15.564 | 9.86 | | |
| 5 | −100.786 | 0.90 | 1.49700 | 81.5 |
| 6 | 32.647 | 0.20 | | |
| 7 | 27.975 | 3.07 | 2.00069 | 25.5 |
| 8 | 75.823 | (Variable) | | |
| 9 (Diaphragm) | ∞ | 0.30 | | |
| 10* | 15.410 | 6.38 | 1.59201 | 67.0 |
| 11* | −41.457 | 0.97 | | |
| 12 | 865.224 | 0.80 | 1.67790 | 55.3 |
| 13 | 14.638 | (Variable) | | |
| 14 | 22.989 | 4.35 | 1.49710 | 81.6 |
| 15* | −30.671 | (Variable) | | |
| 16 | −69.681 | 4.43 | 1.59522 | 67.7 |
| 17 | −12.298 | 0.80 | 1.85478 | 24.8 |
| 18 | −19.189 | (Variable) | | |
| 19 | 52.703 | 0.70 | 2.00100 | 29.1 |
| 20 | 19.139 | (Variable) | | |
| 21* | −16.412 | 1.40 | 1.49710 | 81.6 |
| 22* | −134.380 | 0.15 | | |
| 23 | −1034.372 | 5.34 | 2.00069 | 25.5 |
| 24 | −35.027 | (Variable) | | |
| Image Plane | ∞ | | | |

Aspherical Surface Data

10th Surface

K = 0.00000e+000 A4 = −1.77050e−005 A6 = −5.02997e−008
A8 = −1.31982e−010 A10 = 1.06691e−012

11th Surface

K = 0.00000e+000 A4 = 3.89789e−005 A6 = −1.60822e−007
A8 = 9.59375e−010 A1 0 = −1.43458e−012

15th Surface

K = 0.00000e+000 A4 = 2.59262e−005 A6 = 1.67826e−007
A8 = −2.21218e−009 A10 = 1.30691e−011

21st Surface

K = 0.00000e+000 A4 = −1.92701e−006 A6 = −3.02604e−008
A8 = 1.45772e−009 A10 = −1.35008e−011

22nd Surface

K = 0.00000e+000 A4 = −1.40335e−005 A6 = 7.31668e−008
A8 = −4.67991e−010 A10 = 5.37322e−013

Various Data
Zoom Ratio 2.75

| | Wide Angle | intermediate | telephoto |
|---|---|---|---|
| Focal Length | 24.71 | 39.93 | 67.99 |
| F-number | 4.12 | 4.12 | 4.12 |
| Half Angle of Field | 41.20 | 28.45 | 17.65 |
| Image Height | 21.64 | 21.64 | 21.64 |
| Overall Lens Length | 99.36 | 108.69 | 132.25 |
| BF | 13.50 | 24.36 | 42.60 |
| d 2 | 0.70 | 11.37 | 24.73 |
| d 8 | 22.25 | 10.04 | 2.00 |
| d13 | 2.21 | 3.31 | 4.70 |

-continued

Fourth Numerical Embodiment

| d15 | 3.49 | 2.39 | 0.99 |
| d18 | 2.79 | 2.63 | 1.19 |
| d20 | 8.94 | 9.11 | 10.54 |
| d24 | 13.50 | 24.36 | 42.60 |

Zoom Lens Unit Data

| Unit | starting surface | focal length |
| --- | --- | --- |
| 1 | 1 | 105.76 |
| 2 | 3 | −24.70 |
| 3 | 9 | 65.17 |
| 4 | 14 | 27.17 |
| 5 | 16 | 62.37 |
| 6 | 19 | −30.34 |
| 7 | 21 | 243.76 |

| | Embodiment 1 | Embodiment 2 | Embodiment 3 | Embodiment 4 |
| --- | --- | --- | --- | --- |
| Conditional expression (1) | 20.88 | 20.88 | 20.88 | 25.46 |
| Conditional expression (2) | 1.250 | 1.138 | 1.675 | 1.147 |
| Conditional expression (3) | 4.143 | 5.300 | 4.151 | 4.282 |
| Conditional expression (4) | 1.920 | 2.209 | 1.621 | 1.030 |
| Conditional expression (5) | 4.206 | 5.903 | 3.972 | 4.280 |
| Conditional expression (6) | 0.369 | 0.332 | 0.348 | 0.363 |
| Conditional expression (7) | 4.113 | 4.611 | 3.937 | 4.021 |
| Conditional expression (8) | 0.196 | 0.225 | 0.181 | 0.188 |

While embodiments of the present disclosure have been described above, the present disclosure is not limited to the various embodiments and may be deformed and modified within the gist thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-108261 filed May 31, 2017, which is hereby incorporated by reference herein in its entirety.

What is claimed is:

1. A zoom lens comprising:
a first lens unit that has a positive refractive power;
a second lens unit that has a negative refractive power; and
at least one lens unit,
wherein the first lens unit, the second lens unit, and the at least one lens unit are disposed from an object side to an image side in an order of the first lens unit, the second lens unit, and the at least one lens unit,
wherein a distance between lens units that are adjacent to each other changes when zooming,
wherein the first lens unit is formed of a single piece of lens element,
wherein the zoom lens includes a positive lens on a side closest to an image, and
wherein the following conditional expressions $15.0 < vdp < 30.0$ $0.96 < (skt/skw)/(ft/fw) < 2.0$ $3.0 < lw/fw < 5.0$ $0.33 < |f2/ft| < 0.50$ are satisfied, where vdp is an Abbe number of the positive lens, skw is back focus at a wide angle end, skt is back focus at a telescopic end, fw is focal length of the zoom lens at the wide angle end, ft is focal length of the zoom lens at the telescopic end, lw is a distance from a surface of the zoom lens on a side closest to an object to an image plane on an optical axis at the wide angle end, and f2 is a focal length of the second lens unit.

2. The zoom lens according to claim 1,
wherein a conditional expression $3.0 < |f1/f2| < 6.0$ is satisfied, where f1 is a focal length of the first lens unit and f2 is a focal length of the second lens unit.

3. The zoom lens according to claim 1,
wherein a conditional expression $0.5 < fp/fw < 2.5$ is satisfied, where fp is a focal length of the positive lens.

4. The zoom lens according to claim 1,
wherein a conditional expression $2.0 < f1/fw < 7.4$ is satisfied, where f1 is a focal length of the first lens unit.

5. The zoom lens according to claim 1,
wherein a conditional expression $0.161 < t1/fw < 0.245$ is satisfied, where t1 is a distance along an optical axis from a surface of the first lens unit on a side closest to an object to a surface of the first lens unit on the side closest to the image.

6. The zoom lens according to claim 1,
wherein the at least one lens unit includes a third lens unit that has a positive refractive power, a fourth lens unit that has a positive refractive power, a fifth lens unit that has a positive refractive power, a sixth lens unit that has a negative refractive power, and a seventh lens unit that has a positive refractive power.

7. An image pickup apparatus comprising:
a zoom lens; and
an image pickup element that receives light of an image formed by the zoom lens,
wherein the zoom lens includes a first lens unit that has a positive refractive power, a second lens unit that has a negative refractive power, and at least one lens unit,
wherein the first lens unit, the second lens unit, and the at least one lens unit are disposed from an object side to an image side in an order of the first lens unit, the second lens unit, and the at least one lens unit,
wherein a distance between lens units that are adjacent to each other changes when zooming,
wherein the first lens unit is formed of a single piece of lens element,
wherein the zoom lens includes a positive lens on a side closest to an image,
wherein the zoom lens includes a positive lens on a side closest to an image,
wherein the following conditional expressions $15.0 < vdp < 30.0$ $0.96 < (skt/skw)/(ft/fw) < 2.0$ $3.0 < lw/fw < 5.0$ $0.33 < |f2/ft| < 0.50$ are satisfied, where vdp is an Abbe number of the positive lens, skw is back focus at a wide angle end, skt is back focus at a telescopic end, fw is focal length of the zoom lens at the wide angle end, ft is focal length of the zoom lens at the telescopic end, lw is a distance from a surface of the zoom lens on a side closest to an object to an image plane on an optical axis at the wide angle end, and f2 is a focal length of the second lens unit.

8. The image pickup apparatus according to claim 7, wherein a conditional expression $$3.0<|f1/f2|<6.0$$

is satisfied, where f1 is a focal length of the first lens unit and f2 is a focal length of the second lens unit.

9. The image pickup apparatus according to claim 7, wherein a conditional expression $$0.5<fp/fw<2.5$$

is satisfied, where fp is a focal length of the positive lens.

10. The image pickup apparatus according to claim 7, wherein a conditional expression $$2.0<f1/fw<7.4$$

is satisfied, where f1 is a focal length of the first lens unit.

11. The image pickup apparatus according to claim 7, wherein a conditional expression $$0.161<t1/fw<0.245$$

is satisfied, where t1 is a distance along an optical axis from a surface of the first lens unit on a side closest to an object to a surface of the first lens unit on the side closest to the image.

12. The image pickup apparatus according to claim 7, wherein the at least one lens unit includes a third lens unit that has a positive refractive power, a fourth lens unit that has a positive refractive power, a fifth lens unit that has a positive refractive power, a sixth lens unit that has a negative refractive power, and a seventh lens unit that has a positive refractive power.

* * * * *